US012760820B2

(12) United States Patent
Leavitt

(10) Patent No.: US 12,760,820 B2
(45) Date of Patent: Oct. 13, 2026

(54) PIPE LENGTH AND RELATED METHODS OF PIPE CONNECTION

(71) Applicant: Johnson Screens, Inc., New Brighton, MN (US)

(72) Inventor: Clarence Leavitt, Forked River, NJ (US)

(73) Assignee: JOHNSON SCREENS, INC., New Brighton, MN (US)

( * ) Notice: Subject to any disclaimer, the term of this patent is extended or adjusted under 35 U.S.C. 154(b) by 0 days.

(21) Appl. No.: 17/629,517

(22) PCT Filed: Jul. 24, 2020

(86) PCT No.: PCT/US2020/043536
§ 371 (c)(1),
(2) Date: Jan. 24, 2022

(87) PCT Pub. No.: WO2021/016573
PCT Pub. Date: Jan. 28, 2021

(65) Prior Publication Data

US 2022/0268380 A1 Aug. 25, 2022

Related U.S. Application Data

(60) Provisional application No. 62/877,951, filed on Jul. 24, 2019.

(51) Int. Cl.
*F16L 25/10* (2006.01)
*F16L 37/14* (2006.01)

(52) U.S. Cl.
CPC ............. *F16L 25/10* (2013.01); *F16L 37/148* (2013.01)

(58) Field of Classification Search
CPC ......... F16L 25/10; F16L 37/148; F16L 37/14; F16L 37/142
See application file for complete search history.

(56) References Cited

U.S. PATENT DOCUMENTS 2,013,660 A * 9/1935 Lauer .................... F16L 37/148
2,677,933 A * 5/1954 Hopkinson
(Continued)

FOREIGN PATENT DOCUMENTS

CN 102472420 A 5/2012
CN 109073119 A 12/2018
(Continued)

OTHER PUBLICATIONS

PCT International Search Report for PCT/US2020/043536, mailed Oct. 8, 2020, 2 pages.
(Continued)

*Primary Examiner* — William S. Choi
(74) *Attorney, Agent, or Firm* — HUSCH BLACKWELL LLP

(57) ABSTRACT

A length of pipe and methods of connection that provide a flush, continuous external wall on adjacent lengths of pipe. Each individual length of pipe includes opposed male and female ends. Generally, the female end is dimensioned such that the male end of an adjacent length of pipe is slidably insertable into the female end. When the male end has been fully inserted into the female end, an exterior surface on each of the adjacent lengths of pipe is arranged to define a flush engagement such that an assembled exterior surface defines a continuous, planar surface absent any projections or enlargements. By avoiding any diameter increase at a connection point, the resulting pipe can be more easily installed and/or positioned via sliding or lifting there are no enlarged or projecting portions that can hinder movement of the assembled pipe.

10 Claims, 12 Drawing Sheets

(56) References Cited

U.S. PATENT DOCUMENTS

| | | | | |
|---|---|---|---|---|
| 3,181,897 | A | 5/1965 | Krayenbuhl | |
| 4,487,421 | A | 12/1984 | Housas et al. | |
| 4,749,192 | A * | 6/1988 | Howeth | F16L 37/148 |
| 5,083,820 | A * | 1/1992 | Hopperdietzel | F16L 37/148 |
| 5,255,945 | A | 10/1993 | Toon | |
| 5,360,242 | A | 11/1994 | Argent | |
| 5,813,705 | A * | 9/1998 | Dole | F16L 37/148 |
| 5,816,625 | A * | 10/1998 | Clarke | F16L 37/148 |
| 6,739,629 | B2 | 5/2004 | Riedy et al. | |
| 8,246,084 | B2 * | 8/2012 | Poddar | |
| 9,200,732 | B2 | 12/2015 | Coogan et al. | |
| 9,243,728 | B2 | 1/2016 | Hennemann | |
| 2003/0230896 | A1 * | 12/2003 | Riedy | F16L 37/148 |
| 2003/0234536 | A1 * | 12/2003 | Riedy | F16L 37/148 |
| 2004/0090068 | A1 * | 5/2004 | Evans | |
| 2006/0170213 | A1 | 8/2006 | Mittler | |
| 2010/0194106 | A1 | 8/2010 | Mayr | |
| 2011/0156384 | A1 | 6/2011 | Hennemann | |
| 2014/0182732 | A1 | 7/2014 | Coogan et al. | |
| 2016/0356411 | A1 * | 12/2016 | Clapper | F16L 37/148 |

FOREIGN PATENT DOCUMENTS

| | | | | |
|---|---|---|---|---|
| GB | 2310019 | A * | 8/1997 | |
| WO | WO-9940355 | A1 * | 8/1999 | F16L 37/148 |
| WO | 2018165658 | A1 | 9/2018 | |

OTHER PUBLICATIONS

PCT Written Opinion of the ISA for PCT/US2020/043536, mailed Oct. 8, 2020, 7 pages.

Yao Chundong, "Petroleum Drilling Machinery" Jul. 31, 2007. Petroleum Industry Press, p. 96, 1-10.

* cited by examiner

PIPE LENGTH AND RELATED METHODS OF PIPE CONNECTION

PRIORITY CLAIM

The present application is a National Phase Entry of PCT/US2020/043536, which claims priority to U.S. Provisional Application Ser. No. 62/877,951 filed Jul. 24, 2019 and entitled, "PIPE LENGTH AND RELATED METHODS OF PIPE CONNECTION, which applications are hereby incorporated by reference in their entirety.

TECHNICAL FIELD

The present invention is directed to pipe used in a variety of industrial and commercial settings. More specifically, the present invention is directed to length of pipe and related methods of assembling and interconnecting pipe having male and female ends, whereby a mechanical connection is established between adjacent lengths of pipe such that a connection point between the adjacent lengths of pipe has a flush engagement arrangement on an outer pipe wall of each adjacent length of pipe.

BACKGROUND

Individual lengths of pipe are frequently connected in a variety of commercial and industrial settings. In some cases, the lengths of pipe can be connected to be fluid-tight, while in other instances, the lengths of pipe can act as a connection pathway or "pipe", whereby cables and wiring can be installed, protected and even replaced if necessary. Depending upon the installation environment and actual use, these lengths of pipe can be fabricated of suitable metals and alloys such as, for example, carbon or stainless steel or alternatively of polymeric materials such as fiberglass, HDPE (high density polyethylene) or PVC (poly vinyl chloride). Depending upon the installation and use, these individual lengths of pipe can be permanently connected by welding or using adhesives or the lengths of pipe can be assembled using a variety of connecting assemblies that can subsequently be disconnected. A representative length of pipe and its related method of connection is disclosed in PCT Publication WO2018/165658A1, which is assigned to the Applicant of the present application. This polymeric pipe utilizes a mechanical spline connector to positively connect adjacent lengths of pipe while avoiding any need for chemical curing or bonding. It would be advantageous to further improve upon this design to simplify pipe installation in both horizontal and vertical configurations.

SUMMARY

A pipe design of the present invention improves upon the prior art by providing a connection design that results in a flush arrangement of an outer wall on adjacent lengths of pipe. By avoiding any diameter increase at a connection point, a resulting pipe can be more easily installed and/or positioned via sliding or lifting as an assembled pipe outer wall has a seemingly continuous outer surface with no enlarged or projecting portions that can hinder movement of the assembled pipe.

In one aspect, a representative pipe of the present invention can comprise a length of pipe formed from a suitable metallic or polymeric material and having opposed male and female ends. Generally, the female end is dimensioned such that the male end of an adjacent length of pipe is slidably insertable into the female end. When the male end has been fully inserted into the female end, an exterior surface on each of the adjacent length of pipe arranged so as to define a flush connection such that an assembled exterior surface defines an essentially continuous, planar surface absent any projections or enlargements. The female end can include one or more circumferential sealing channels into which a seal member, for example, an o-ring seal is positionable. Between the circumferential sealing channels and a female open end is an internal spline groove that is circumferentially defined within the interior of the pipe. The female end can further comprise a wall bore through a pipe wall that intersects with the internal spline groove. The male end can include an exterior spline groove on an exterior of the pipe. As such, when the male end of a first length of pipe is fully inserted into a female end of a second length of pipe, the one or more seal members provide a fluid-tight seal between the first and second lengths of pipe and the internal spline groove and external spline groove are aligned such that the external spline groove is visible through the wall bore. A spline can be inserted through the wall bore and into a space cooperatively defined by the internal spline groove and the external spline groove. The spline can be fully inserted such that the spline circumferentially occupies the space cooperatively defined by the internal spline groove and the external spline groove. When the spline has been fully inserted, a tab on the spline can be positioned and reside within the wall bore so as to not project from the continuous, planar surface of the assembled pipe. Should a user wish to disassemble the connected lengths of pipe, the user merely grabs the tab, pulls the spline out the wall bore and then withdraws the male end from the female end. When adjacent lengths of pipe are joined, a combined pipe wall provides a generally continuous exterior surface due to the flush connection of adjacent male and female ends. Generally, embodiments of the pipe of the present invention can provide one or more positive feedback elements that indicate when the insertion of the male end into the female end has been fully accomplished. The female end can define a flat internal edge or circumferential internal flange, which acts as a positioning element for a corresponding, male end wall on the male end. In a similar manner, the male end can define a flat external edge, or circumferential external flange, which acts as a positioning element for a corresponding female end wall on the female end.

In another aspect, the present invention is directed to a method of coupling adjacent lengths of pipe to form a generally continuous exterior surface on a combined pipe. The method can comprise a step of positioning a male end of a first length of pipe proximate a female end of a second length of pipe. The method can further comprise positioning one or more seal members, for example, o-ring seals within circumferential sealing channel defined within an interior portion of the female end. The method can further comprise inserting the male end into the female end such that the seal members created a fluid-tight seal between an interior wall of the female end and an exterior wall of the male end. The method can further comprise advancing the male end into the female end until an external circumferential spline groove on the male end is aligned with an internal circumferential spline groove on the female. In some embodiments, confirmation of the alignment of the external circumferential spline groove with the internal circumferential spline groove is verified by viewing the external circumferential spline groove through a wall bore in the second length of pipe that intersects with the internal circumferential spline groove. The method can further comprise defining a continuous, planar surface on an exterior of the first and second lengths of pipe when the male end is fully inserted into the female end so as to avoid any projection or enlargements on the exterior of assembled pipe. The method further comprises introducing a spline through the wall bore and into a cooperatively defined space defined by the internal and external circumferential spline grooves. The spline is circumferentially advanced through the cooperatively defined space. A tab on the spline can be positioned within the wall bore when the spline has been fully, circumferentially advanced such that the tab does not project from the continuous, planar surface of the assembled pipe. In some embodiments, the method can further comprise disassembly the first and second lengths of pipe by grasping the tab and withdrawing the spline from the cooperatively defined space. At that point, the male end can be withdrawn from the female end to complete disassembly of the first and second lengths of pipe.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying FIG.s, in which.

Figure 1:
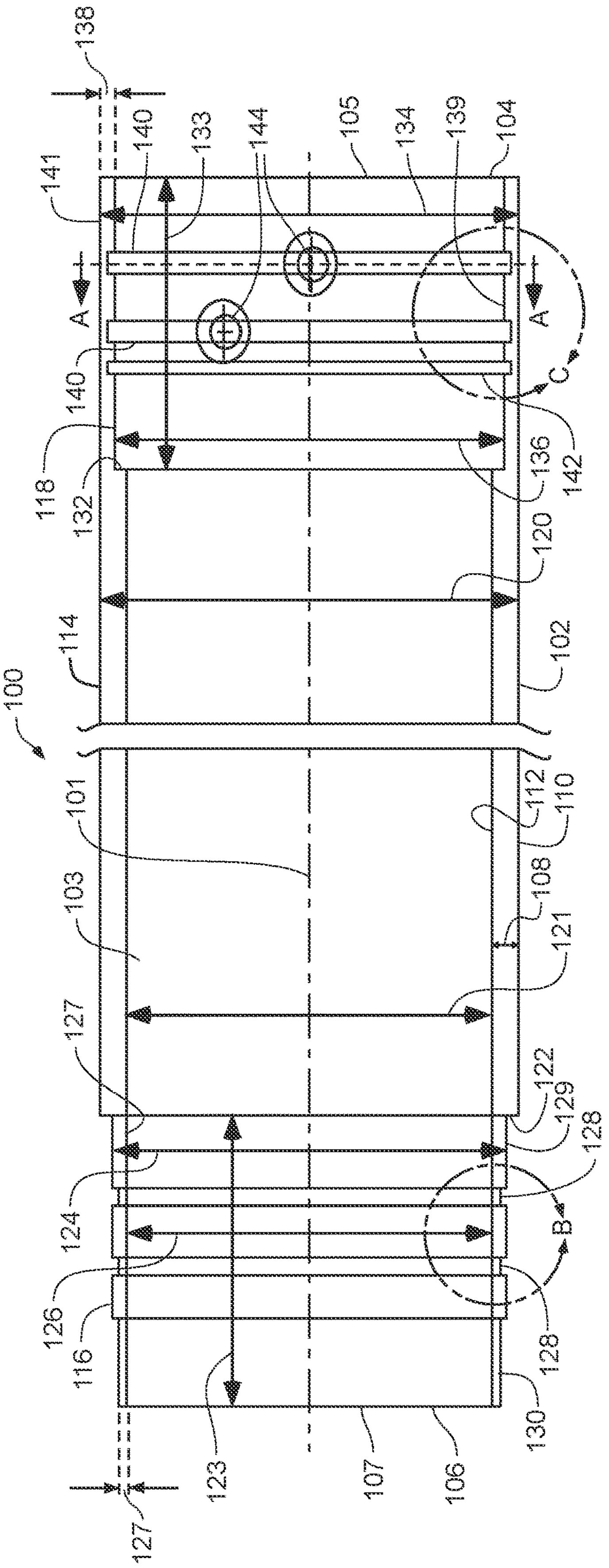
FIG. 1 is a partially hidden, side view of a length of pipe according to a representative embodiment of the present invention.
Figure 2:
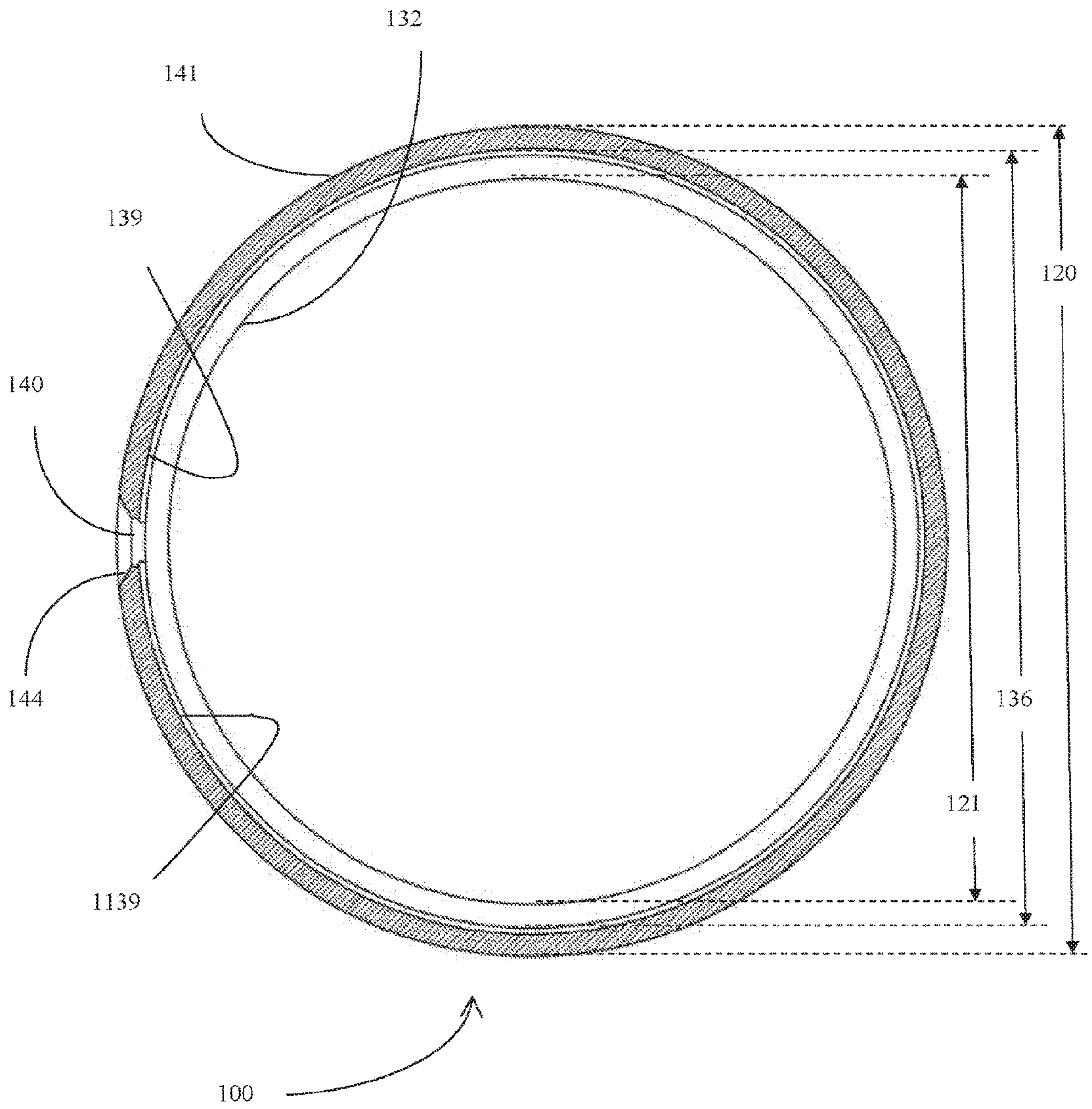
FIG. 2 is a section view of the pipe of FIG. 1 taken a line A-A of FIG. 1.
Figure 3:
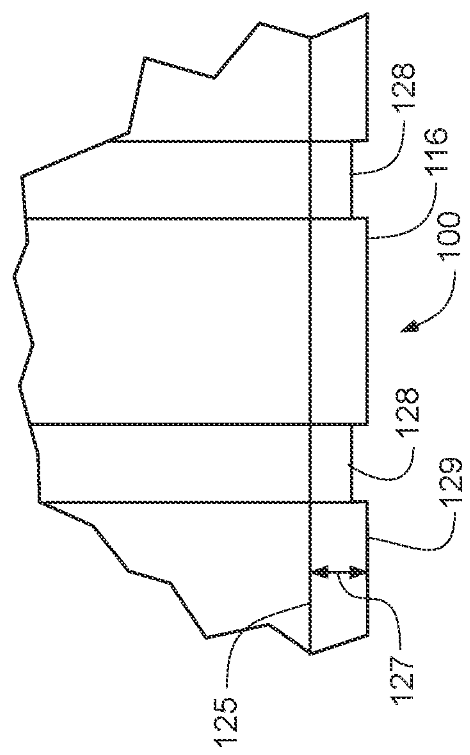
FIG. 3 is a detailed side view of the pipe of FIG. 1 taken at Detail B of FIG. 1.
Figure 4:
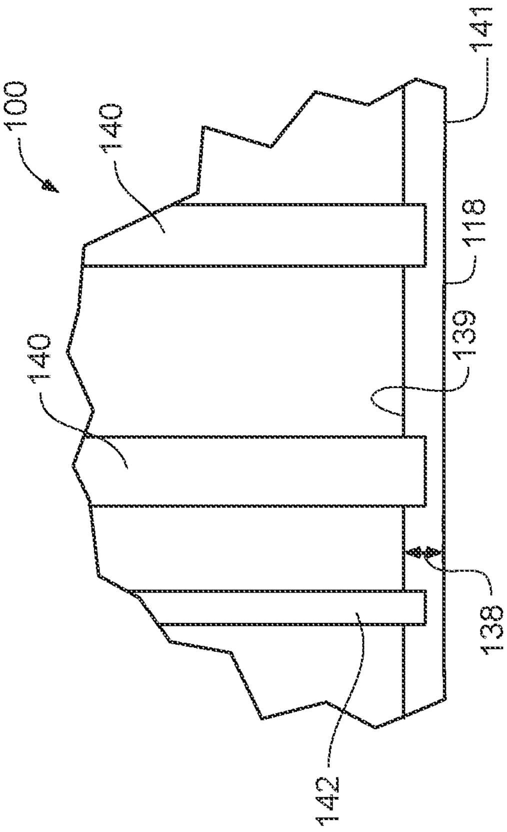
FIG. 4 is a detailed side view of the pipe of FIG. 1 taken at Detail C of FIG. 1.
Figure 5:
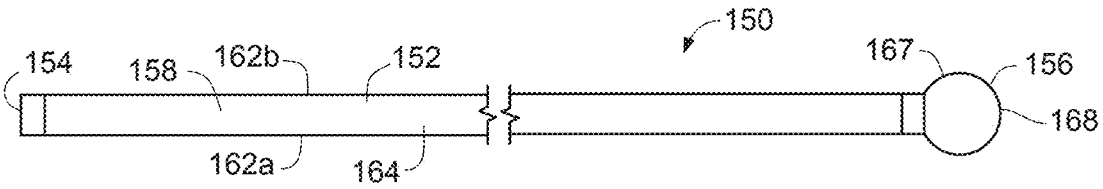
FIG. 5 is a plan view of a spline according to a representative embodiment of the present invention.
Figure 6:
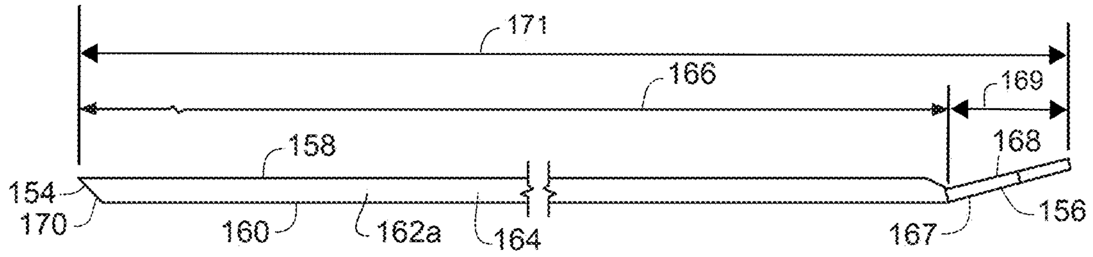
FIG. 6 is a side view of the spline of FIG. 5.
Figure 7:
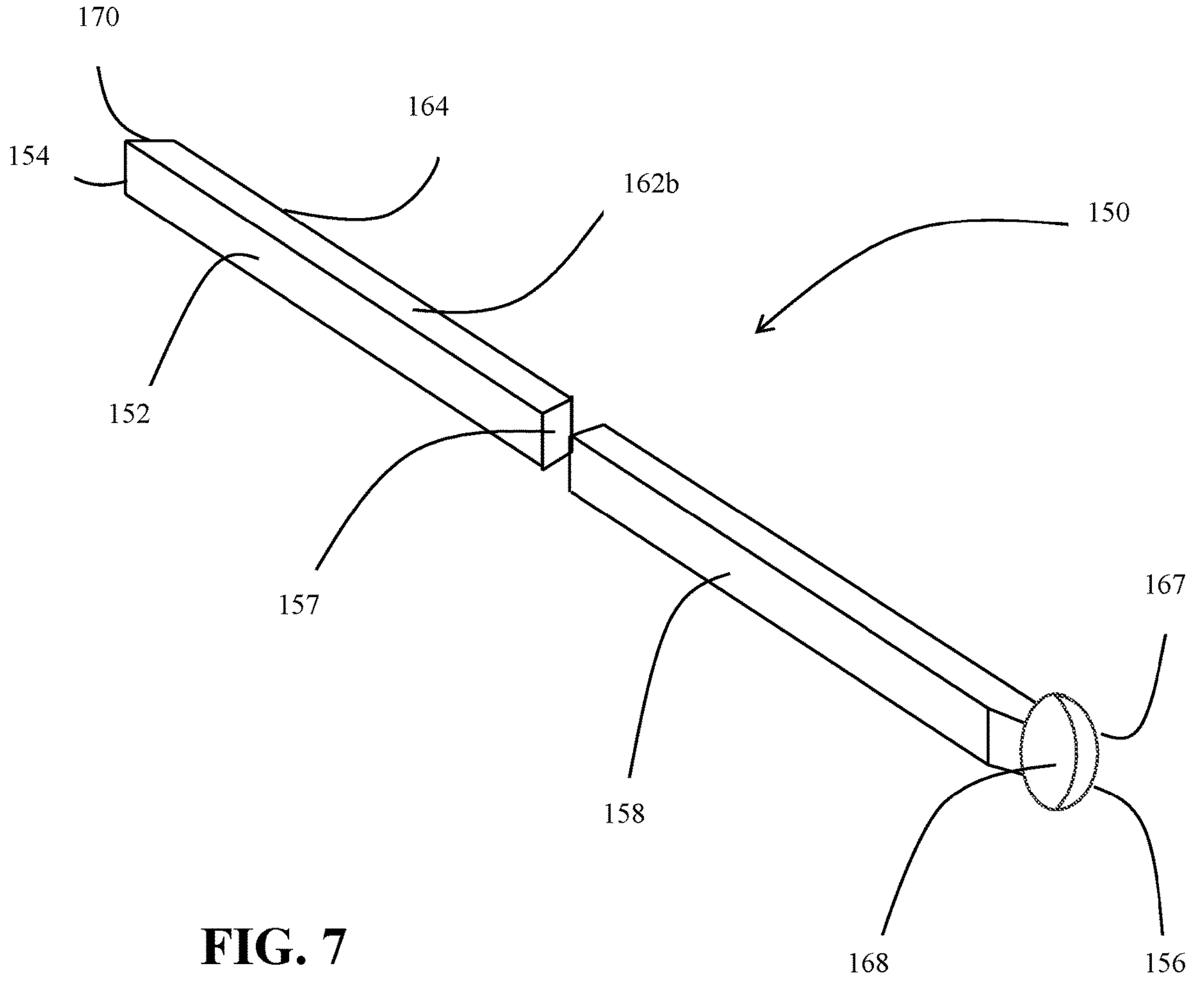
FIG. 7 is a perspective view of the spline of FIG. 5
Figure 8A:
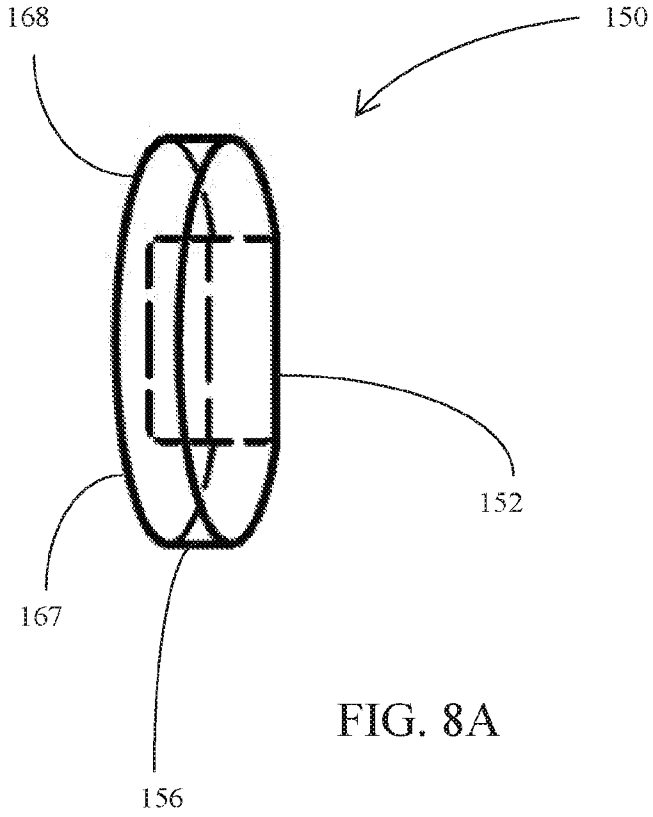
FIG. 8A is an end view of the spline of FIG. 5.
Figure 8B:
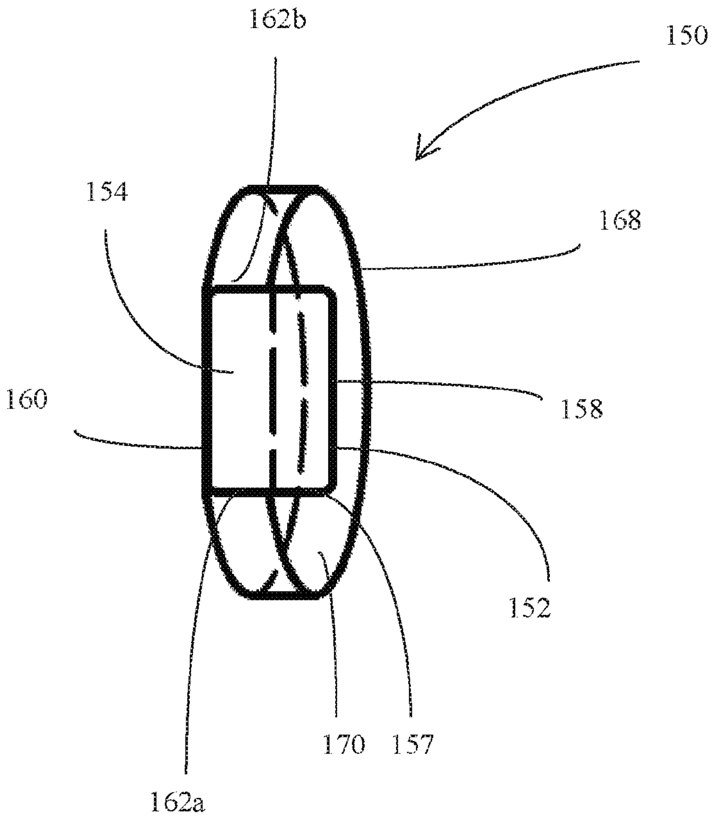
FIG. 8B is an opposite end view of the spline of FIG. 5

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

As illustrated in FIGS. 1-4, a length of pipe 100 according to a representative embodiment of the present invention can comprise a pipe body 102 having a female end 104 and a male end 106. Pipe body 102 generally defines a pipe channel 103 that extends continually along a pipe axis 101 between a female opening 105 defined at the female end 104 and a male opening 107 defined at the male end 106. Pipe body 102 is generally fabricated of a single material and can be formed of suitable metallic materials such as carbon or stainless steel or polymeric materials including, for example, polyvinyl chloride (PVC), high density polyethylene (HDPE), fiberglass and other suitable polymers.

With further reference to FIGS. 1-4, the pipe body 102 includes a continuous portion 114 defined between a male insertion portion 116 and a female receiving portion 118. Generally, the continuous portion 114 has a body wall thickness 108 defined by an outer body surface 110 and inner body surface 112. Continuous portion 114 further defines a pipe external diameter 120 and a pipe internal diameter 121. Pipe external diameter 120 and pipe internal diameter 121 will generally reflect overall external and internal dimensions when adjacent lengths of the pipe 100 have been successfully connected and are ready for use.

Male insertion portion 116 is defined between a machined external wall/insertion flange 122 and the male end 106 and defines an insertion length 123. Male insertion portion 116 defines an insertion portion external diameter 124 and an insertion portion internal diameter 126. Insertion portion external diameter 124 is reduced as compared to pipe external diameter 120 while the insertion portion internal diameter 126 is essentially equal to the pipe internal diameter 121 such that an insertion wall thickness 127 between a male inner surface 125 and a male outer surface 129 is reduced as compared to body wall thickness 108. Male insertion portion 116 includes one or more external circumferential insertion channels 128 and a tapered external wall 130 wherein the insertion portion external diameter 124 shrinks as it approaches the male opening 107. At the male opening 107, the tapered external wall 130 defines a male end wall surface 131.

Female receiving portion 118 is defined between a machined internal wall/internal receiving flange 132 and the female 104 and defines a receiving length 133. Female receiving portion 118 defines a receiving portion external diameter 134 and a receiving portion internal diameter 136. Receiving portion external diameter 134 is essentially equal to the pipe external diameter 120 while the receiving portion internal diameter 136 is larger than the pipe internal diameter 121 such that a receiving wall thickness 138 between a female inner surface 139 and a female outer surface 141 is reduced as compared to body wall thickness 108. Female receiving portion 118 includes one or more internal circumferential receiving channels 140 and one or more internal circumferential sealing channels 142. Each circumferential receiving channel 140 includes a wall bore 144 that fully extends through the receiving wall thickness 138 such that the circumferential receiving channel 140 is accessible from the female outer surface 141. Preferably, the wall bore 144 for each circumferential receiving channel 140 is radially spaced at a different radial location with respect to the pipe axis 101. The female receiving portion 118 defines a female end wall surface 145 at the female opening 105.

As seen in FIGS. 5, 6, 7, 8A and 8B, a representative connecting member, for example, a spline 150 generally comprises a spline body 152 including an insertion end 154 and a manipulation end 156. The spline body 152 can comprise a square or rectangular cross-section 157 defined by a top surface 158, a bottom surface 160 and a pair of side surface 162*a*, 1626. The spline body 152 generally comprises a retention portion 164 having a retention length 166 and a manipulation portion 167 having a manipulation length 169. Manipulation portion 167 can comprise an angled tab 168 or similar feature that promotes grabbing or coupling. Insertion end 154 can define an angled surface 170. The spline 150 has a spline length 171 which is the sum of the retention length 166 and the manipulation length 169. The spline 150 is generally fabricated of a flexible polymeric material such as, for example, nylon and similar ductile materials.

Figure 9:
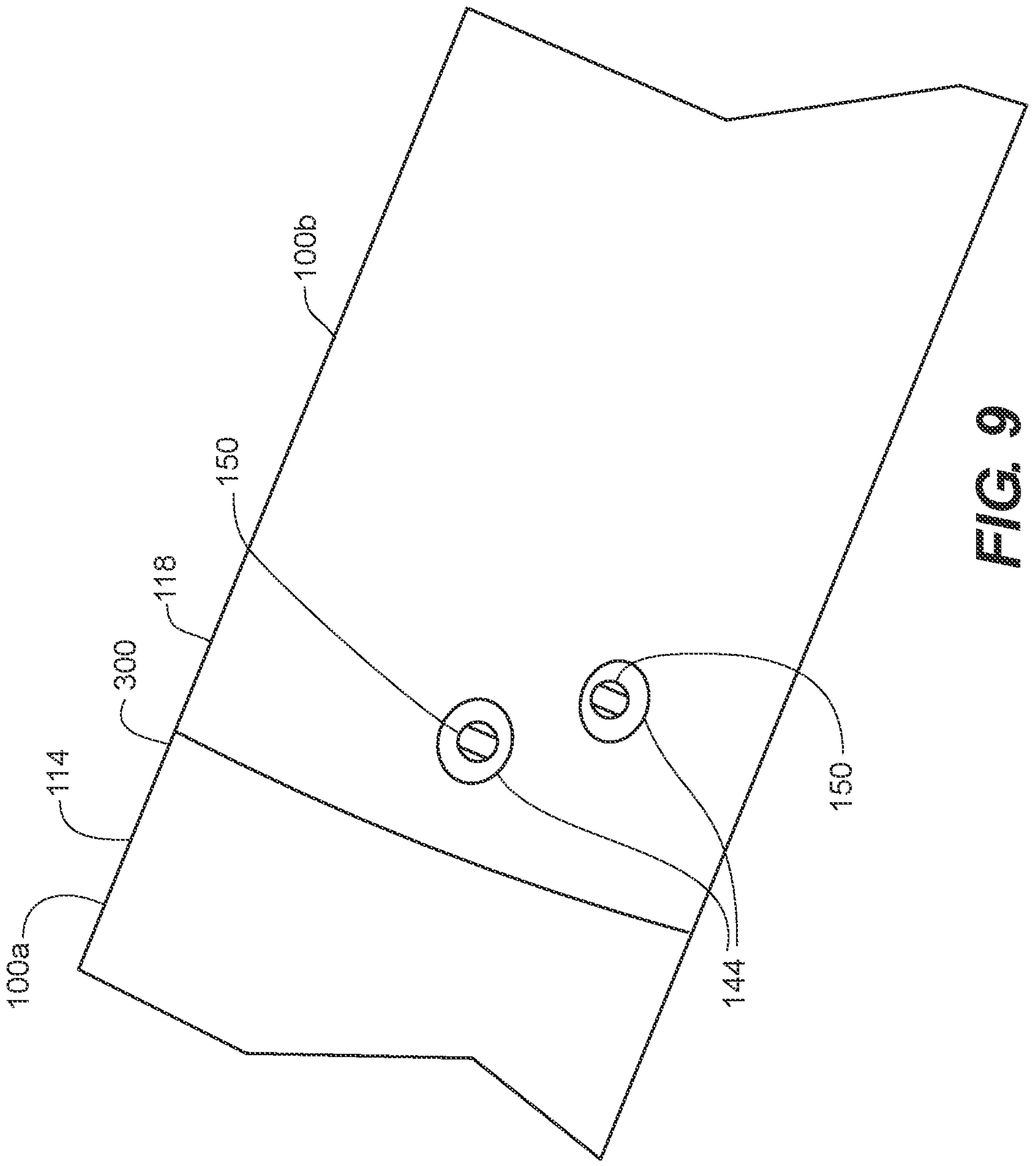
FIG. 9 is a perspective view of a length of combined pipe according to a representative embodiment of the present invention.
Figure 10:
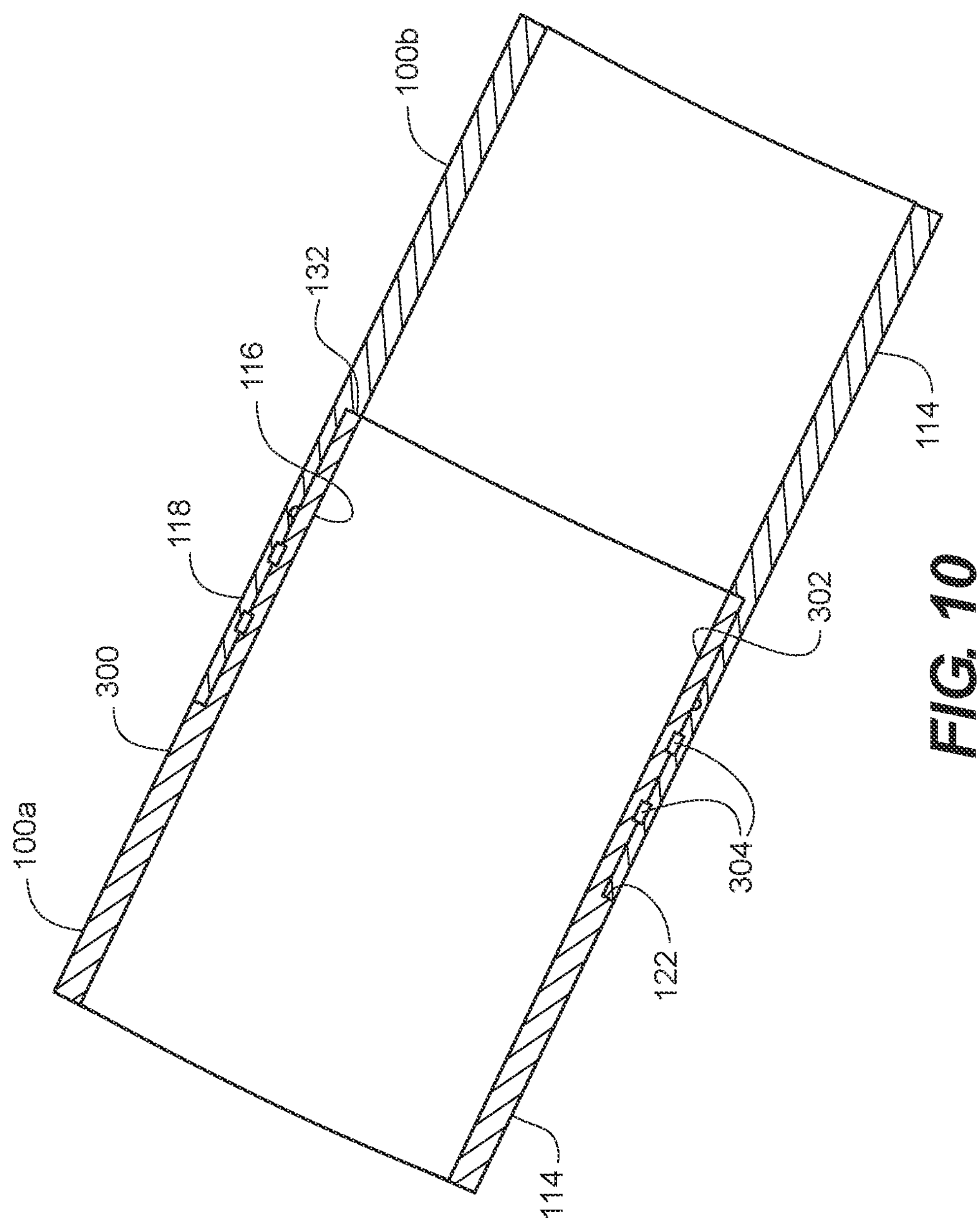
FIG. 10 is a perspective section view of the length of combined pipe of FIG. 9.
Figure 11:
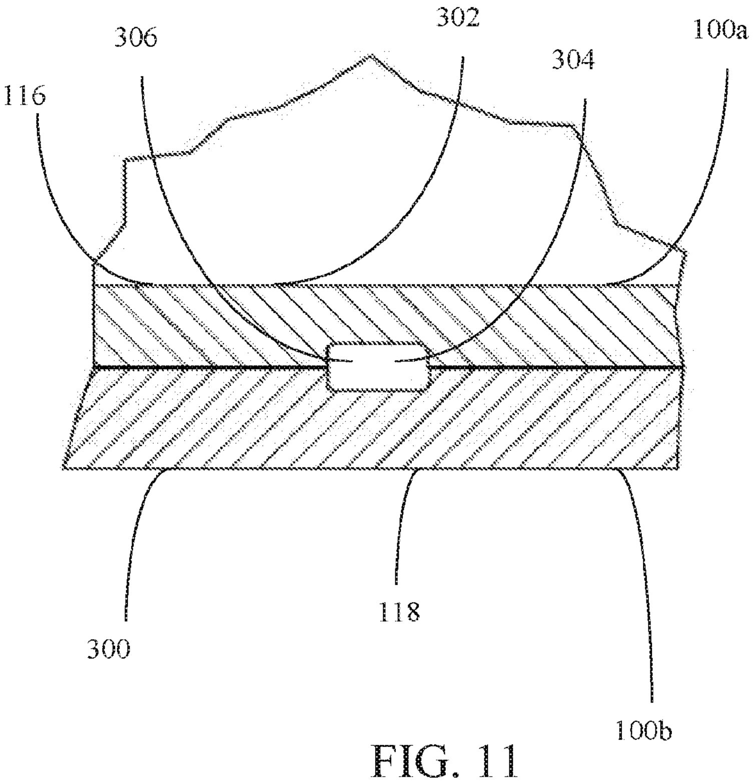
FIG. 11 is a detailed perspective section view of the length of combined pipe of FIG. 9 taken at Detail D of FIG. 10.

In use, adjacent lengths of the pipe 100 are generally positioned in line with one another as shown in FIGS. 9-11 such that the male end 106 of a first pipe 100*a* is proximate the female end 104 of a second pipe 100*b* with first and second pipes 100*a*, 100*b* each being an individual length of pipe 100. Next, an o-ring seal 204 is positioned within each of the one or more circumferential sealing channels 142 at the female end 104 of the second pipe 100*b*. O-ring seal 204 is preferably constructed of a compressible polymeric material and can be selected to be highly compatible with conditions expected to be experienced by the pipe 100 such as, for example, temperature and chemical compatibility. With the help of the tapered exterior wall 130, the male end 106 of the first pipe 100*a* is slidingly introduced and inserted into the female opening 105 of the second pipe 100*b*. The male end 106 is fully advanced into the female opening 105 until the male end 106 and more specifically, the male end wall surface 131 comes into contact with the machined internal wall/internal receiving flange 132. The insertion length 123 is fabricated to be equal to the receiving length 133 such that when the male end 106 is fully inserted into the female opening 105, the female end wall surface 145 contacts the machined external wall/insertion flange 122 such that the continuous portion 114 of the first pipe 100*a* resides against the female receiving portion 118 of the second pipe 100*b*. As the pipe external diameter 120 and the receiving portion external diameter 134 are equal, the connection of the first pipe 100*a* and the second pipe 100*b* results in a flush, continuous external surface 300 for the joined first pipe 100*a* and second pipe 100*b*. At the same time, insertion of male end 106 into the female end 104 causes the male outer surface 129 to compress the o-ring seal 204 and form a fluid tight seal between the first pipe 100*a* and second pipe 100*b*. With the male end 106 fully advanced against the internal receiving flange 132, a continuous internal surface 302 is defined as the insertion portion internal diameter 126 equals the pipe internal diameter 121. The positive interactions and limits provided by the physical engagement of the male end wall surface 131 with the machined internal wall/internal receiving flange 132 as well as the female end wall surface 145 with the machined external wall/insertion flange 122 verify the proper positioning of the first pipe 100*a* and second pipe 100*b*.

With the male end 106 of the first pipe 100*a* fully inserted into the female end 104 of the second pipe 100*b* as shown in FIGS. 9-11, the external circumferential insertion channels 128 on the first pipe 100*a* will be directly aligned with and in communication with the circumferential receiving channels 140 of the second pipe 100*b* so as to define one or more combined connector channels 304 with each wall bore 144 now in communication with the corresponding combined connector channel 304. In some embodiments, the external circumferential insertion channels 128 can include a color different from the pipe body 102 such that the color is visible through the wall bore 144 so as to confirm proper alignment of the external circumferential insertion channels 128 on the first pipe 100*a* with the circumferential receiving channels 140 on the second pipe 100*b*.

Once the combined connector channel 304 is defined, a user can then slidably introduce the insertion end 154 of the spline 150 through the wall bore 144 such that the insertion end 154 enters into the combined connector channel 304. Using the manipulation portion 167, the user continues to advance the spline body 152 through the wall bore 144 such that the insertion end 154 is advanced circumferentially through the combined connector channel 304. The retention length 166 is preferably selected to equal the circumferential length of the combined connector channel 304. As such, the insertion end 154 travels circumferentially around the combined connector channel 304 and approaches the wall bore 144. At that point, and because the spline length 171 exceeds the retention length 166, and consequently the circumferential length of the combined connector channel the angled tab 168 can be snapped into and reside with the wall bore 144. Preferably, the square or rectangular cross-section 157 of the spline body 152 matches a combined cross-section 306 of the combined connector channel 304 as continually, circumferentially defined by the external circumferential insertion channels 128 on the first pipe 100*a* and the circumferential receiving channels 140 of the second pipe 100*b*.

This method of attachment of the male end 106 to the female end 104 can be repeated for any number of lengths of pipe 100 so as to couple any number of adjacent pipes together. To disassemble the pipe, a user simply grasps the angled tab 168 by hand or with an appropriate tool and pulls the spline 150 out of the combined connector channel 304. Following removal of the spline 150, a user can simply pull the male end 106 from the corresponding female end 104 to complete disassembly of adjacent lengths of pipe 100.

Figure 12:
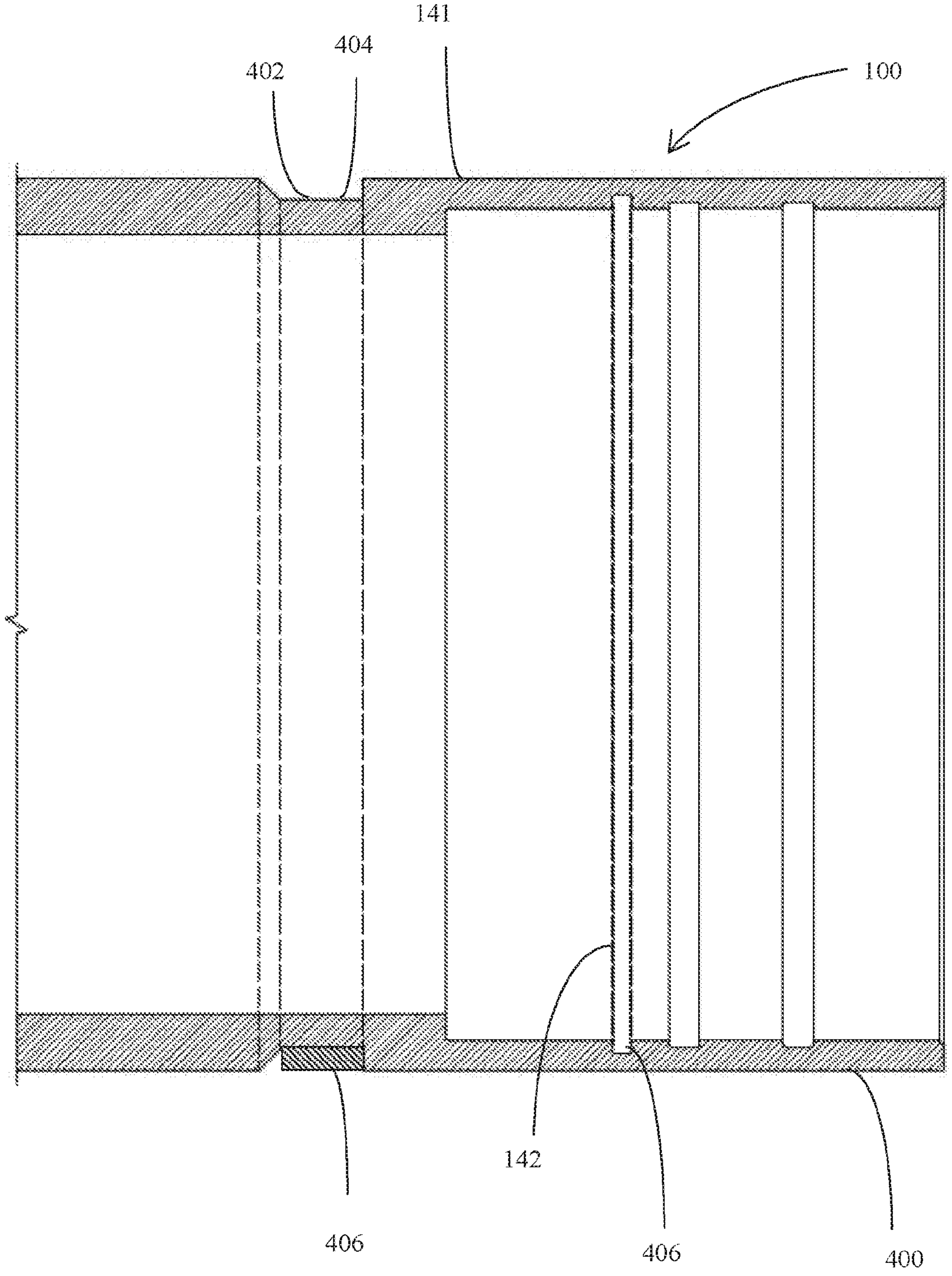
FIG. 12 is a partially hidden, side view of a female end of a length of pipe according to another representative embodiment of the present invention.

With reference to FIG. 12, another embodiment of pipe 100 can comprise a female end 400 that substantially resembles female end 104 but with additional reinforcement and retention features. As illustrated, female end 400 can comprise one or more circumferential exterior grooves 402 having an exterior groove cross-section 404 defined in the female outer surface 141. The one or more circumferential exterior grooves 402 are adapted to received a reinforcement band or clamp 406 to provide additional structural support for installations where the integrity of pipe 100 is critical or in question. Preferably, the reinforcement band or clamp 406 seats fully within the exterior grove cross-section 404 so that no portion of the reinforcement band or clamp projects outwardly from the female outer surface 141.

Figure 13:
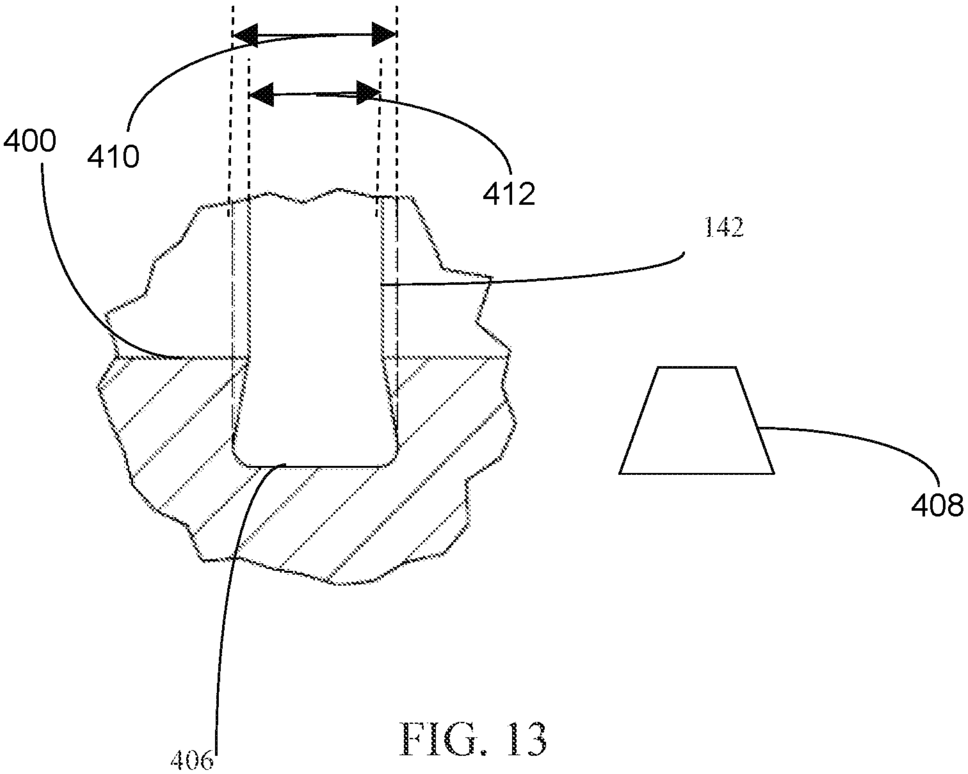
FIG. 13 is a detailed side view of the female end of FIG. 12.

With further reference to FIGS. 12 and 13, female end 400 can be fabricated such that the one or more internal circumferential sealing channels 142 defines a dovetailed cross-section 406 to accommodate a similarly shaped seal, for example, a dovetailed o-ring seal 408. With the dovetailed cross-section 406, a recessed section width 410 is greater than a surface width 412 such that the dovetailed o-ring seal 408 essentially snaps into the circumferential sealing channel 142 and is better retained during shipping and/or installation of the pipe 100.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A pipe system, comprising:

a first pipe having a first male end and a first body portion, the first male end including at least one external circumferential insertion channel defining a first male external diameter and a first male internal diameter, the first body portion defining a first body external diameter and a first body internal diameter, wherein the first body external diameter is greater than the first male external diameter and the first body internal diameter is equal to the first male internal diameter;

a second pipe having a second female end including at least one internal circumferential receiving channel wherein the internal circumferential receiving channel is aligned and in communication to define at least one combined connector channel when the first male end is fully inserted into the second female end, the second female end defining a second female external diameter and a second female internal diameter, the second female external diameter being equal to the first body external diameter and the second female internal diameter being equal to the first male external diameter such that the first male end is slidably insertable to the second female end such that the first body portion and the second female end define a flush, continuous external pipe surface when the first male end is fully inserted into the second female end; and a connecting member insertable through a wall bore and into the at least one combined connector channel whereby the connecting member retains the first male end within the second female end and comprises a spline connector having a spline body having a retention portion and a manipulation portion, the retention portion having a retention length and the manipulation portion having a manipulation length where a sum of the retention length and the manipulation length defines a spline length and where the retention length is equal to a circumferential length of the at least one combined connector channel, the manipulation portion having an angled tab, the spline body defining a spline cross-section matching a combined cross-section of the at least one combined connector channel, wherein the retention length and spline cross-section fill the combined connector channel, and wherein the spline length exceeds the circumferential length of the at least one combined connector channel such that the angled tab snaps into the wall bore such that the angled tab does not project from the flush, continuous external pipe surface.

2. The pipe system of claim 1, wherein the first pipe further comprises a first female end, the first female end defining a first female external diameter and a first female internal diameter, the first female external diameter being equal to the second female external diameter and the first female internal diameter being equal to the second female internal diameter.

3. The pipe system of claim 1, wherein the second pipe further comprises a second body portion and a second male end, the second male end defining a second male external diameter and a second male internal diameter, the second body portion defining a second body external diameter and a second body internal diameter, wherein the second body external diameter is greater than the second male external diameter and the second body internal diameter is equal to the second male internal diameter.

4. The pipe system of claim 1, wherein the first male end includes a tapered end portion proximate a male opening wherein the tapered end portion facilitates the insertion of the first male end into the second female end.

5. The pipe system of claim 1, wherein the second female end defines one or more internal circumferential sealing channels for receiving a compressible seal member, said compressible seal member being compressed during insertion of the first male end into the second female end to form a fluid-tight seal between the first pipe and the second pipe.

6. The pipe system of claim 5, wherein the one or more internal circumferential sealing channels defines a sealing channel cross-section wherein a recessed channel width is greater than a surface channel width and wherein the compressible seal member has a seal cross-section substantially matching the sealing channel cross-section such that the compressible seal member is retained within the corresponding internal circumferential sealing channel.

7. The pipe system of claim 1, wherein the first body external diameter and the first male external diameter define an insertion flange that distinguishes the first male end and the first body portion, the first male end having an insertion length between a male opening and the insertion flange.

8. The pipe system of claim 7, wherein the second pipe includes an internal receiving flange that distinguishes the second female end from a second body portion, the second female end having a receiving length that equals the insertion length such that the insertion flange resides against the second female end when the first male end is fully inserted into the second female end.

9. The pipe system of claim 1, wherein the second female end defines one or more circumferential exterior grooves in a female outer surface, each circumferential exterior groove adapted to receive a reinforcement band providing external structural support to the first pipe and the second pipe when the first male end is fully inserted into the second female end.

10. A method for coupling adjacent lengths of pipe, comprising:

positioning a male end of a first length of pipe proximate a female end of a second length of pipe;

advancing the male end into the female end such that an external circumferential insertion channel on the first length of pipe is aligned with an internal circumferential receiving channel on the second length of pipe to cooperatively define a circumferential connector channel having a circumferential channel length and a circumferential channel cross-section and a flush, continuous external pipe surface is defined along the first length of pipe and the second length of pipe;

directing an insertion end of a spline body through a wall bore in the second length of pipe, said wall bore in communication with the internal circumferential receiving channel such that the wall bore provide access to the circumferential connector channel, the spline body having a retention portion and a manipulation portion, the retention portion having a retention length and the manipulation portion having a manipulation length with the sum of the retention length and the manipulation length defining a spline length, the retention length equal to the circumferential channel length, the retention portion defined a spline cross-section matching the circumferential cross-section, the manipulation portion comprising an angled tab;

advancing the spline body into the circumferential connector channel such that the spline body fills the circumferential connector channel; and snapping the angled tab into the wall bore as the spline length exceeds the circumferential channel length, such that the angled tab does not project from the flush, continuous external pipe surface.

* * * * *